(12) United States Patent
Degioanni

(10) Patent No.: US 12,341,824 B2
(45) Date of Patent: Jun. 24, 2025

(54) AUTOMATED SERVICE-ORIENTED PERFORMANCE MANAGEMENT

(71) Applicant: Sysdig, Inc., San Francisco, CA (US)

(72) Inventor: Loris Degioanni, Davis, CA (US)

(73) Assignee: Sysdig, Inc., San Francisco, CA (US)

( * ) Notice: Subject to any disclaimer, the term of this patent is extended or adjusted under 35 U.S.C. 154(b) by 0 days.

(21) Appl. No.: 18/397,512

(22) Filed: Dec. 27, 2023

(65) Prior Publication Data

US 2024/0129343 A1 Apr. 18, 2024

Related U.S. Application Data

(63) Continuation of application No. 18/079,769, filed on Dec. 12, 2022, now Pat. No. 11,870,817, which is a continuation of application No. 16/911,955, filed on Jun. 25, 2020, now Pat. No. 11,528,300, which is a continuation of application No. 16/443,476, filed on Jun. 17, 2019, now Pat. No. 10,708,310, which is a continuation of application No. 15/447,668, filed on Mar. 2, 2017, now Pat. No. 10,382,492.

(51) Int. Cl.
*H04L 9/40* (2022.01)
*G06F 21/52* (2013.01)

(52) U.S. Cl.
CPC .............. *H04L 63/20* (2013.01); *G06F 21/52* (2013.01); *H04L 63/1425* (2013.01); *G06F 2221/033* (2013.01)

(58) Field of Classification Search
CPC ....... H04L 63/20; H04L 63/1425; H04L 63/18; H04L 63/205; G06F 21/52; G06F 2221/033
See application file for complete search history.

(56) References Cited

U.S. PATENT DOCUMENTS

| | | |
|---|---|---|
| 9,471,778 B1 | 10/2016 | Seo et al. |
| 10,182,016 B2 | 1/2019 | Birke et al. |
| 2013/0326620 A1 | 12/2013 | Merza et al. |
| 2016/0080417 A1* | 3/2016 | Thomas .............. H04L 63/1416 726/1 |

(Continued)

OTHER PUBLICATIONS

Israeli Claims in Application No. 277396, dated Aug. 2021, 6 pages.

(Continued)

*Primary Examiner* — Joseph P Hirl
*Assistant Examiner* — Thomas A Gyorfi
(74) *Attorney, Agent, or Firm* — Kim & Stewart LLP

(57) ABSTRACT

A computer-implemented method of monitoring applications executing on a plurality of computing nodes, includes the steps of: deploying agents on each of the computing nodes to detect operations performed on different objects by the executing applications; at each of the computing nodes, storing by a corresponding one of the agents, records of the operations performed on the different objects by the executing applications and associating each of the operations with a set of metadata properties; organizing the operations into groups based on the metadata properties; for one of the groups, generating a monitoring rule based on properties of the stored records of the operations of the one group; and configuring the agents according to the generated monitoring rule.

20 Claims, 4 Drawing Sheets

(56) References Cited

U.S. PATENT DOCUMENTS

| | | |
|---|---|---|
| 2016/0191465 A1 | 6/2016 | Thomas et al. |
| 2016/0359740 A1* | 12/2016 | Parandehgheibi ...... H04L 47/32 |
| 2016/0359872 A1 | 12/2016 | Yadav et al. |
| 2017/0201535 A1 | 7/2017 | Nishiyama |
| 2018/0218149 A1 | 8/2018 | Jacobs et al. |
| 2020/0329073 A1 | 10/2020 | Degioanni |

OTHER PUBLICATIONS

Israel Patent Office "Office Action", in Application No. 277396, dated Aug. 25, 2021, 5 pages.
European Patent Office "Search Report", in Application No. 22160904.3-1213, dated Jul. 1, 2022. 115 pages.

* cited by examiner

AUTOMATED SERVICE-ORIENTED PERFORMANCE MANAGEMENT

BENEFIT CLAIM

This application claims the benefit under 35 U.S.C. § 120 as a continuation of U.S. application Ser. No. 18/079,769, filed Dec. 12, 2022, which is a continuation of U.S. application Ser. No. 16/911,955, filed Jun. 25, 2020, now U.S. Pat. No. 11,528,300, issued on Dec. 13, 2022, which is a continuation of U.S. application Ser. No. 16/443,476, filed Jun. 17, 2019, now U.S. Pat. No. 10,708,310, issued on Jul. 7, 2020, which is a continuation of U.S. application Ser. No. 15/447,668, filed Mar. 2, 2017, now U.S. Pat. No. 10,382,492, issued on Aug. 13, 2019, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

The present disclosure generally relates to management monitoring of computer program applications and components of those applications termed services. The disclosure relates more specifically to computer-implemented techniques for automatically generating security rules to monitor operations performed by applications and components of those applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Protecting computer program applications running on networked computing devices typically involve some aspect of monitoring applications. Monitoring can involve collecting application messages and other data traffic that the applications emit toward a network, directed at peer instances of the applications, directed at servers, or directed at client computing devices.

Approaches for protecting computer program applications against security threats can be grouped in the following categories: vulnerability detection, network based approaches, and runtime access control. Vulnerability detection involves examining computer program binary files to determine if known vulnerabilities exists. Specifically, static vulnerability detection approaches involve scanning program executables or virtual container images for virus signatures. One of the major drawbacks to this approach is that virus signature definitions require frequent updating. Without updated virus definitions, scanning program executables may miss new vulnerabilities, such as zero day vulnerabilities.

Network based approaches to identifying security threats involve examining network traffic to detect malicious activity. However, network based approaches have limited visibility into application behavior because specific types of application activity, such as file I/O, does not have any corresponding network activity to be detected at the network level.

Runtime access control involves limiting the type and number of actions that specific computer programs can perform. Computer programs implemented within a virtual environment such as a virtual machine or container may be monitored using runtime access control. Containerization has emerged as a popular alternative to virtual machine instances for developing computer program applications. With containerization, computer program code can be developed once and then packaged in a container that is portable to different platforms that are capable of managing and running the containers. Consequently, containerization permits faster software development for the same program for multiple different platforms that would otherwise require separate source branches or forks, or at least different compilation and execution environments. The DOCKER containerization system from Docker, Inc. of San Francisco, California has emerged as a popular choice for containerization architecture. However, containerization also can impose constraints on inter-program communications.

Runtime access control includes mandatory access control techniques. Mandatory access control techniques involve operating systems constraining the ability of an initiator to access or perform an operation on a target object. Examples of mandatory access control include Security-Enhanced Linux (SELinux) which is a Linux kernel security module that provides a mechanism for supporting access control security policies. Another example of access control involves a sandboxing approach, such as seccomp, which is a security mechanism for separating running programs and restricting the number of system calls allowed to be made from the computer program. However, runtime access control approaches have several drawbacks. One such drawback is that it requires a manually defined set of rules for each unique program monitored. Defining program specific rules involves customized manual interaction and may require continuous updating when programs contain changes or version updates. Another drawback includes the high level of maintenance to ensure that the manually defined rules are behaving correctly and do not become stale or generate false positives or false negatives.

The term "microservices" describes a modular way to architect applications, so that they are split into independent units (i.e., "services") which communicate through application programming interfaces (APIs) and well defined interfaces. Microservices bring many benefits, such as reduction of the number of points of failure; a structure that enables multiple teams to work concurrently on the same application, and supports continuous delivery; better separation of concern and responsibility; and scalability.

Further information about microservices is available online at the time of this writing in the article "Microservices" in the "wiki" folder of the domain "en.wikipedia.org" and the present disclosure presumes that the reader is knowledgeable about microservices at least to the extent set forth in the foregoing article. Microservices have been adopted by many enterprises in the past, but we're now seeing a big push toward them, driven by the rise of containerization technologies like Docker.

Containers offer a way to package and isolate individual applications and allows for finer grain access control than generally supported by existing access control techniques such as SELinux and seccomp, which are typically implemented to provide system level protection. Therefore a more flexible monitoring and protection system that does not require manually defining sets of rules is desirable.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In an embodiment, a data processing method provides an improvement in automatically generating programmed rules to detect anomalous operations in computer systems executing containerized computer program applications. The method comprises a computer system creating and storing, within digital data storage, a score threshold value that is associated with determining whether to generate a baseline operation rule for detecting anomalous operations. The computer system receives, from one or more service monitoring processes that are executing on one or more computer systems, datasets of operations that have been performed on digital objects by one or more processes associated with one or more computer applications executing on the one or more computer systems. Each of the datasets of operations includes a set of operations data representing records of operations that were performed by particular processes associated with a particular computer application running on the one or more computer applications. The computer system aggregates operations from the datasets of operations by grouping operations together using common identifiers associated with the operations and identifying operation properties from the aggregated operations. The computer system generates an aggregated baseline dataset that represents operation properties identified from the aggregated operations. The computer system assigns score values to each of the operation properties in the aggregated baseline dataset, where each assigned score value represents whether a particular operation property is a candidate for generating a rule that defines expected operation property values for the particular operation property. The computer system automatically generates a set of baseline operation rules for only those operation properties in the aggregated baseline dataset that have assigned values that exceed the score threshold value. The generated set of baseline operation rules are programmed to detect anomalous operations that contain unexpected operation property values. Other aspects and features of various embodiments will become apparent from the disclosure as a whole as described in other sections herein.

1. Structural Overview

Figure 1:
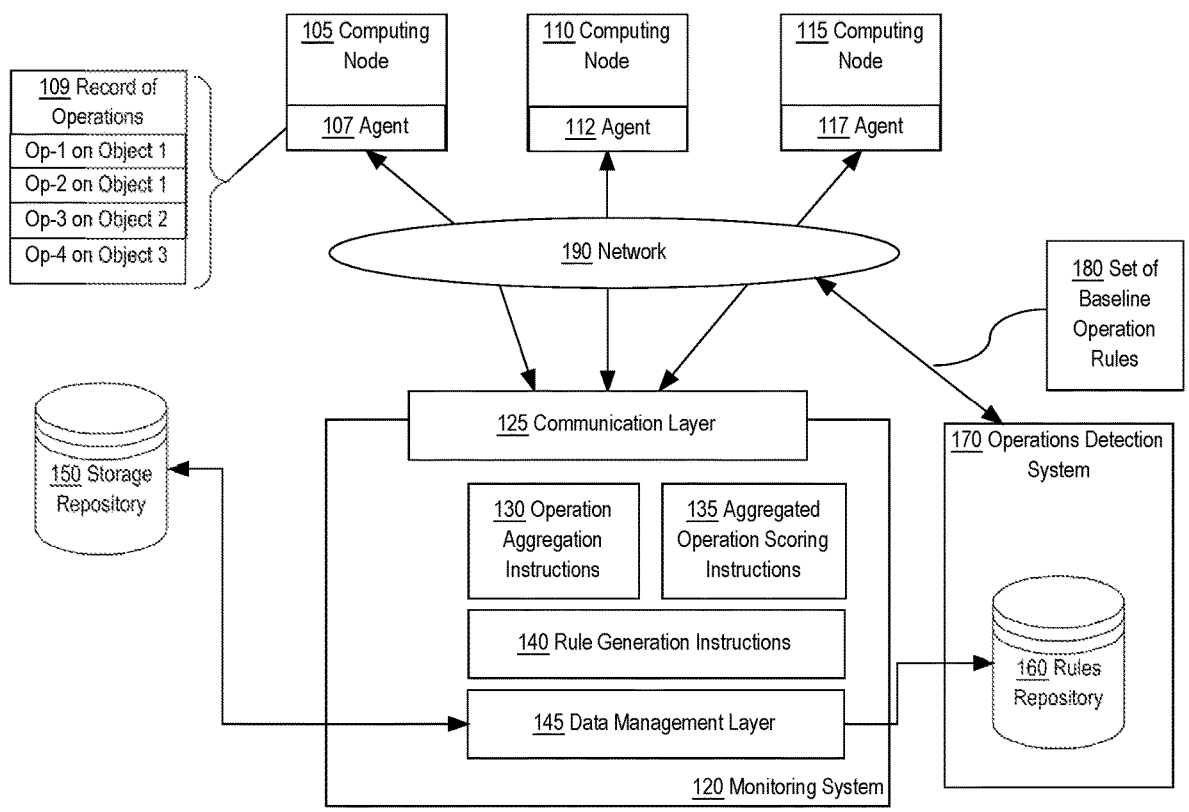
FIG. 1 illustrates an example computer network according to an embodiment.

FIG. 1 illustrates an example computer data communications network that is structured and programmed to implement one embodiment of the techniques herein. FIG. 1 depicts a distributed monitoring system comprising a monitoring system 120, a plurality of computing nodes 105, 110, 115, and a network 190 that communicatively couples the monitoring system 120 to the plurality of computing nodes 105, 110, and 115. In an embodiment, the monitoring system may represent one or more separate computer systems communicatively coupled and configured to receive datasets of operations from multiple computing nodes, aggregate and score the operations within the datasets, and generate a set of baseline operation rules that may be used by the multiple computing nodes to detect anomalies in future operations performed by applications implemented on the multiple computing nodes.

In an embodiment, the monitoring system 120 is programmed with or comprises a communication layer 125 and a data management layer 145. "Layer," in this context, refers to any combination of electronic digital interface circuits, microcontrollers, firmware such as drivers, and/or computer programs or other software elements.

The communication layer 125 may be programmed or configured to perform input/output interfacing functions including receiving datasets of operations from the plurality of computing nodes 105, 110, 115 and sending data back to the plurality of computing nodes 105, 110, 115. In an embodiment the datasets of operations contain records of operations performed on objects by applications running within containers or other environments within the plurality of computing nodes 105, 110, 115. The communication layer 125 may be programmed or configured to send the received datasets of operations to a storage repository 150 and retrieve stored rules data from a rules repository 160.

The data management layer 145 may be programmed or configured to manage read operations and write operations involving the storage repository 150 and the rules repository 160 and other functional elements of the system, including queries and result sets communicated between the functional elements of the system and the repository. Examples of data management layer 145 include JDBC, SQL server interface code, and/or HADOOP interface code, among others. The storage repository 150 and the rules repository 160 may each comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In an embodiment, the monitoring system 120 contains specially configured logic including, but not limited to, operation aggregation instructions 130, aggregated operation scoring instructions 135, and rule generation instructions 140. Each of the operation aggregation instructions 130, the aggregated operation scoring instructions 135, and the rule generation instructions 140 comprises executable instructions loaded into a set of one or more pages of main memory, such as RAM, in the monitoring system 120 which when executed cause the monitoring system 120 to perform the functions or operations that are described herein. For example, the operation aggregation instructions 130 may comprise executable instructions loaded into a set of pages in RAM that contain instructions which when executed cause performing aggregation functions on captured computer operations that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the operation aggregation instructions 130, the aggregated operation scoring instructions 135, and the rule generation instructions 140 also may represent one or more files or projects of source code that are digitally stored in a mass storage device such as non-volatile RAM or disk storage, in the monitoring system 120 or a separate repository system, which when compiled or interpreted cause generating executable instructions which when executed cause the monitoring system 120 to perform the functions or operations that are described herein with reference to those modules. In other words, the drawing figure may represent the manner in which programmers or software developers organize and arrange source code for later compilation into an executable, or interpretation into bytecode or the equivalent, for execution by the monitoring system 120.

The operation aggregation instructions 130 provide instructions to aggregate the received datasets of operations from the different computing nodes 105, 110, and 115 and generate an aggregated baseline dataset of operation properties. The aggregated baseline dataset of operation properties may contain property values from similar operations that have been grouped together based upon common attributes. The aggregated operation scoring instructions 135 provide instructions to assign score values to each of the property elements within the aggregated baseline dataset. In an embodiment, the assigned score values are used to determine whether property elements may be used to create baseline operation rules to detect anomalous operations on the plurality of computing nodes 105, 110, and 115. The rule generating instructions 140 provide instructions to automatically generate a set of baseline operation rules from elements in the aggregated baseline dataset that have score values that exceed a configured score value threshold. The baseline operation rules may be programmed to detect future anomalous operations performed by applications running on the plurality of computing nodes 105, 110, and 115.

The network 190 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The monitoring system 120, the plurality of computing nodes 105, 110, and 115, and other elements of the system each comprise an interface compatible with the network 190 and are programmed or configured to use standardized protocols for communication across the networks such as TCP/IP, Bluetooth, and higher-layer protocols such as HTTP, TLS, and the like.

The plurality of computing nodes 105, 110, and 115 each represent computer systems programmed and configured to execute one or more applications, virtual computer environments, virtual computer management services, and other computer processes. Virtual computer environments may include several different types of implemented virtual machines that virtualize a computer operating system and the applications programmed to run on the virtual operating system. Virtual computer management services may include implementations of containerization services for managing multiple containers running different applications. In an embodiment, each of the plurality of computing nodes 105, 110, and 115 contain agents 107, 112, and 117 respectively. The agents 107, 112, and 117 each represent a monitoring agent programmed and configured to capture information from processes, threads, and containers running on the plurality of computer nodes 105, 110, and 115. Records of operations 109 represents an embodiment of a dataset of operations captured by the agent 107. The records of operations 109 may include sets of operations performed on different objects by one or more applications, processes, and threads on computing node 105. Example of objects may include, but are not limited to, files, directories, processes, pipes, network connections, network ports, IP and subnet endpoints, and system calls.

Figure 2:
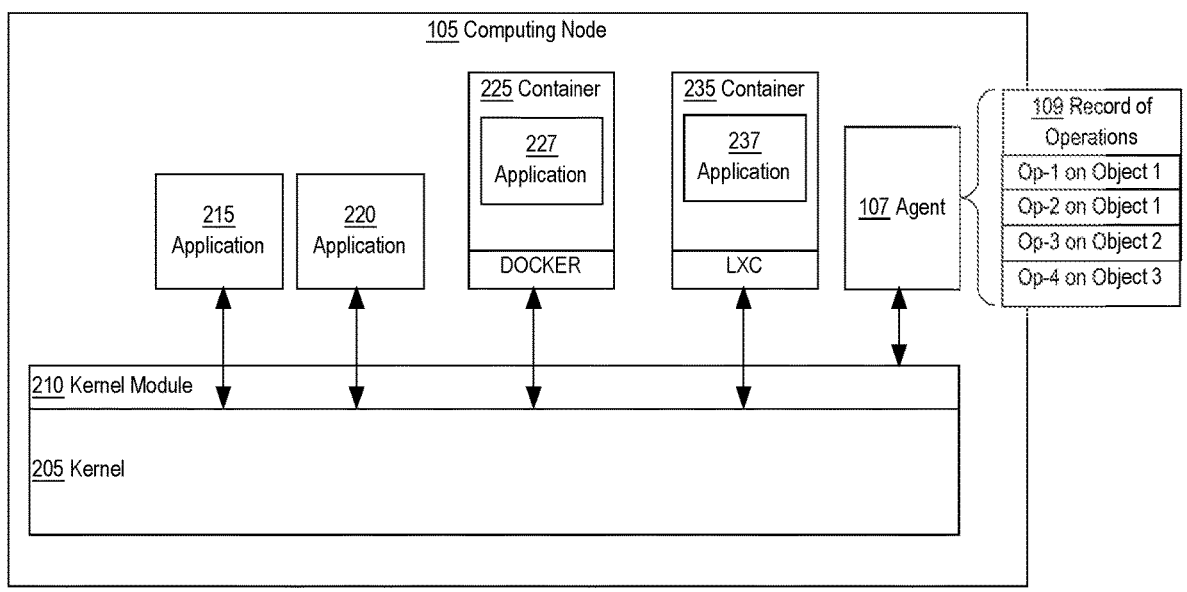
FIG. 2 illustrates an example of a computing node and interactions between containers, applications, and a monitoring agent within the computing node.

FIG. 2 depicts a detailed example of interactions within a computing node between instantiated containers, applications, and an agent.

In an embodiment, the computing node 105 may be programmed and configured to implement one or more virtual computer management services. The virtual computer management services may be configured to manage multiple containers and applications using a set of shared computer resources. In an embodiment, the shared computer resources are managed by kernel 205. Kernel 205 may represent several different types of operating system layers that manages the computing resources between the computing node 105 and the instantiated containers and applications. Kernel module 210 represents a configured or programmed module of computer instructions programmed to send and receive data between the kernel 205 and the instantiated containers and applications.

Applications 215 and 220 each represent applications that may be instantiated directly by the kernel 205. Containers 225 and 230 each represent instances of containers instantiated by the kernel 205. Each of the containers 225 and 235 may instantiate one or more distinct applications instances with the containers 225 and 230. Additionally, containers 225 and 235 may each represent different types of containers managed by different container management systems. For example, container 225 may represent a container managed by Docker that includes an instance of application 227 running within the container 225. Container 235 may represent a container managed by LXC that includes an instance of application 237 running within container 235. In an embodiment, agent 107 communicates directly with the kernel module 210 to receive different types of kernel activity occurring between the kernel 205, application 215, application 220, container 225, container 235, and the computing node 105.

Each of the agents 107, 112, and 117 and the monitoring system 120 may communicate with each other through an API. For example, the monitoring system 120 may issue calls in a pre-arranged format, for example over HTTP (Hypertext Transfer Protocol), to obtain information from the agents 107, 112, and 117 related to the computing nodes 105, 110, and 115, including the number or applications and containers. Alternatively, the API may be "push" based. That is, the agents 107, 112, and 117 may send information to the monitoring system 120 without receiving a call from the monitoring system 120.

In an embodiment, operations detection system 170 represents a monitoring management system that may organize configuration options for monitoring computer services. The operations detection system 170 may be configured to manage and delegate stored operation rules for specific computing nodes, containers, and applications and transmit operation rules to one or more agents in order to monitor and detect operation anomalies based upon the stored operation rules. In an embodiment, operations detection system 170 may include the rule repository 160, where operation rules may be stored.

2. Functional Overview

Figure 3:
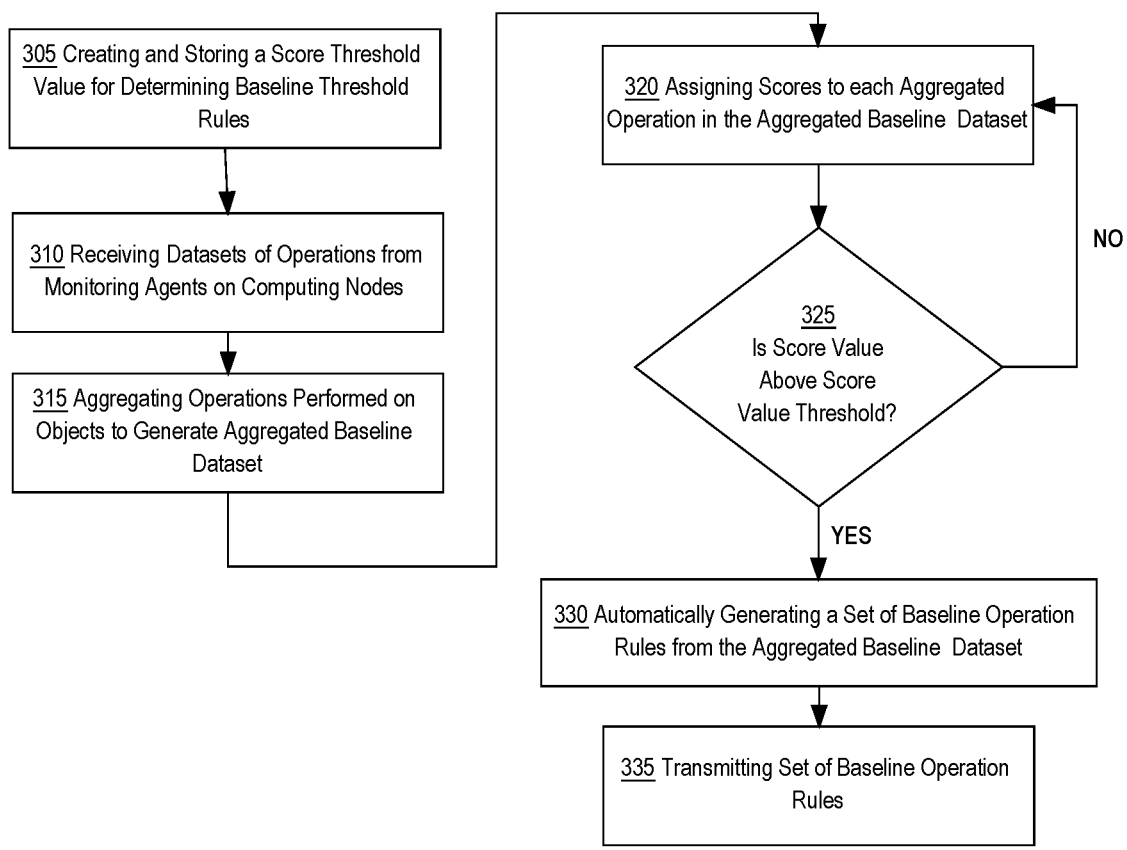
FIG. 3 illustrates an example process for automatically generating rules to detect anomalous operations from multiple processes from multiple computing devices.

FIG. 3 illustrates an example process for automatically generating rules to detect anomalous operations in computer systems. FIG. 3 is a flow diagram that is disclosed at the level of detail and using the terms of communication that are customarily used by persons of the level of skill in the art to whom this disclosure is directed. FIG. 3 may be used as a plan or algorithm that serves as a basis for writing program instructions to implement, by execution using a computer, the process represented in the drawing.

At step 305, a score threshold value is created and stored. The score threshold value is a baseline cutoff score used to determine whether a baseline operation rule is to be generated based on score values for property elements of operations. For example, received datasets of operations may be aggregated based upon operation attributes, such as operation type or any other grouping. In this context, operation type refers to different types of operations that may be performed on different objects, such as opening an object file, connecting to a network port, or saving an object file. The property elements of aggregated operations may then be scored based upon the similarity of property element values such as, input, and/or output values. Based upon the calculated score value of the property element, if the calculated score value is above the generated score threshold value, then a baseline operation rule may be generated that describes the expected outcome of the property element for that operation type.

In an embodiment, the rule generation instructions 140 provide instructions to create a score threshold value. The score threshold value may be generated based on a historical score threshold value used to generate existing baseline operation rules and the score values associated with the aggregated operations. For example, if the existing baseline operation rules were previously successful in detecting operation anomalies in a set of computing nodes, then the score threshold value for the existing baseline operation rule may be used to generate a new set of baseline operation rules for a new set of operations and computing nodes. Conversely, if the existing baseline operation rules were not successful in detecting operation anomalies, then the score threshold value may be set to a value higher than the historical score threshold value. In other embodiments, the score threshold value may be generated from input supplied by a user in the form of rule configuration parameters and user feedback used to determine the optimal score threshold value. In yet other embodiments, the score threshold value may be based on a combination of user input parameters and historical score threshold value data.

At step 310, the monitoring system 120 receives datasets of operations from a plurality of agents 107, 112, and 117 deployed on computing nodes 105, 110, and 115 respectively. In an embodiment, the agent 107 may utilize markers within kernel source code, such as tracepoints, to instrument different places within the operating system kernel in order to extract activity information. For example, the kernel module 210 may be configured with tracepoints to capture information including, but not limited to, system calls, file system activity, disk activity, network and socket activity, established connections, open ports, process and thread execution, and inter process communications such as pipes and mutexes. As represented in FIG. 2, the agent 107 may capture the activity information from the kernel module 210.

In an embodiment, the agent 107 may continuously listen for the activity information from the kernel module 210 and store the activity information in one or more record tables called program tables. The program tables may be configured to contain detailed or aggregated records of operations performed by each process, thread, and container monitored by the agent 107. Records, within the program table, may contain properties describing: the operation executed; the process or program that executed the operations, where the program may represent an aggregation of multiple processes that run the same executable; the object that was the target of the operation; the application within which the operation was executed; and the container within which the operation was executed. In an embodiment, records may be configured to be stored in a specific format. For example, records within the program table may be formatted as JavaScript Object Notation (JSON), Extensible Markup Language (XML), Protocol Buffers developed by Google, or any other data formatting standard.

In an embodiment, the agent 107 may be configured to generate multiple program tables, where the records of operations for each application are stored in a dedicated program table for that particular application. For example, a program table may be created for the application Dropbox and another program table may be created for the application Microsoft Outlook.

Records of operations, within the program table, may be organized into groups based upon properties of the operations. In an embodiment, operations may be organized into groups based upon the type of objects accessed by the operations. For example, an operation may access a particular file or directory. The particular file or directory may be used to organize groups of operations that access that type of file or directory. Different objects types may include, but are not limited to, files, directories, server ports, bound ports, IP endpoints, subnet endpoints, executed programs and system calls. Each of these object types may be further organized into a hierarchy of subgroups. For example, operations organized by the object type "files" may be subdivided into the specific type of file accessed by the operation. Examples of subgroups of "files" include, but are not limited to, startup files and regular files. Startup files may include files that are initially accessed by the application, such as files that are accessed within seconds of starting the application. Regular files include files that are accessed by the application during regular activity after initialization. In an embodiment, subgroups of object types may be further subdivided into smaller subgroups based on properties of the objects within each of the subgroups. For example, the subgroup "startup files" may be further subdivided into subgroups based upon access permissions associated with the files. One such subgroup may include all startup files that have read only access, another subgroup may include all startup files that have read/write access, and yet another subgroup, called "other", may include files where permissions could not be determined.

In an embodiment, the program table may be organized in a hierarchical format where the records of operations are grouped and sub-grouped in a hierarchal format. TABLE 1 in the APPENDIX illustrates an example of a program table formatted as JSON output.

In an embodiment, TABLE 1 is sent by the agent 107 on computing node 105, via network 190, to the monitoring system 120. The communication layer 125 may receive multiple program tables as datasets of operations including TABLE 1. In an embodiment, the communication layer 125 may store received program tables in the storage repository 150.

In an embodiment, the communication layer 125 may also receive metadata from the plurality of computing nodes 105, 110, and 115 that includes, but is not limited to, host names, user tags, cloud service provider instance tags, container names, container identifiers, container labels, container image names, container identifiers, orchestrator labels, and orchestrator annotations. The received metadata may be stored within the storage repository 150 and may be used to group operations from multiple program tables based upon common identifiers and tags from the operations. For example, the metadata may be used to identify relevant properties from operations within different program tables based upon various metadata tags. Operations that have similar metadata properties may then be aggregated to generate an aggregated baseline dataset of data that represents operations that have similar metadata properties.

At step 315 operations represented in the program tables are aggregated to generate an aggregated baseline dataset. In an embodiment, the operation aggregation instructions 130 provide instructions to generate an aggregated baseline dataset by grouping operations together based on properties, identifiers, and metadata associated with the operations. In an embodiment the aggregated baseline dataset may be represented as a data structure that contains aggregated property data from operations grouped together based upon their similar properties. In an embodiment, multiple aggregated baseline datasets may be generated, where each dataset represents a group of operations grouped together by one or more common properties.

In an embodiment, the operation aggregation instructions 130 provide instructions to retrieve stored metadata and the program tables stored in the storage repository 150. The stored metadata may be used as key values to aggregate operations from the multiple program tables. For example, operations, within the multiple program tables, may be analyzed to determine which operations were executed within a container. Determining whether operations were executed within a container may be based on whether the operations contain a container ID property value. In an embodiment, the container ID values from operations from multiple program tables may be cross-referenced against the stored metadata to determine additional property values related to the container ID values. For example, container image names and other container information may be associated with the container ID values.

Operations may be aggregated based upon a common property such as a container ID value for the purpose of generating an aggregated baseline dataset. In an embodiment, aggregating operations may include traversing through groups and sub-groups of operations, within a program table, that match a particular container ID value. During aggregation, each of property values from the operations are aggregated to generate the aggregated baseline dataset. The aggregated baseline dataset may be organized as a data structure of property types and sub-types with elements and sub-elements representing properties and sub-properties from the operations used to make up the aggregated baseline dataset. For example, elements may represent properties such as, files accessed, executed programs, subnet endpoints, IP endpoints, server ports, directories accessed, and bound ports. Each of the elements may also contain sub-elements that represent specific sub-property types for each property element. For example, the element "files accessed" may include sub-elements that group files based on permission type, such as sub-elements for "read only" files, "read/write" files, and "unknown permission" files. Each element and sub-element may contain a set of one or more values populated from the operations. The set of values may contain duplicate values from multiple operations. For example, the local port element for a particular application may contain a set of values as {80, 80, 80, 80}, where values extracted from each of the four operations are the same value for the local port element. By tracking duplicate values in the set of values, the monitoring system 120 may be able to determine, based on the number to similar values, an expected value for a particular property.

In an embodiment, the aggregated baseline dataset may contain tracked values that track the total number of values within a set of values and the number of distinct values in the set of values for each of the elements and sub-elements. The total number of values and the number of distinct values may be used to determine which property elements have consistent values. For example, a distinct value count may be recorded for elements representing connections to local ports and remote ports. Local port values for the operations associated with the particular aggregated baseline dataset may be the same if the operation originated from the same container and therefore the distinct values count is equal to one. Whereas remote port values for operations may contain distinct values as the operations may be associated to several different remote locations, therefore the distinct value count is likely to be calculated as a high value. As a result, each of the elements in an aggregated baseline dataset contains distinct value counts that may be used to determine which elements have consistently common values and may be used for rule generation and which elements have distinct values and may not be useful for rule generation.

In an embodiment, generating the aggregated baseline dataset is not limited to determining groupings of operations based on any single metadata value. Combinations of metadata values may be used to determine groups of operations. For example, container ID combined with cloud service provider instance tags may be used to identify subsets of operations that contain both a common container ID and a cloud service provider instance tag for generating an aggregated baseline dataset of operations called redis:2.8.19/US West, where the container ID is redis:2.8.19 and the cloud service provider instance tag is US West. Generating the aggregated baseline dataset based upon a combination of metadata values may be useful in determining consistent values related to a subset of operations associated with a combination of metadata values, which may not have been detected if operations were grouped using only a single metadata value. TABLE 2 in the APPENDIX illustrates an example of an aggregated baseline dataset displayed in a hierarchal format with elements and sub-elements including a distinct value count.

At step 320, score values are assigned to elements in the aggregated baseline dataset. In an embodiment, the aggregated operation scoring instructions 135 provide instruction to assign score values to elements in the aggregated baseline dataset. The score value for a particular element represents whether the property element is suitable for generating a rule for detecting anomalies based on the property element values. In this context, the rule represents the expected property values for similar operations. If an operation generates a property value that is not consistent with expected property values in the defined rule, then the operation may be deemed as an anomalous operation.

In an embodiment, a high score value for a particular property element represents that the property element contains consistent values that may be candidates for generating rules to identify anomalies. For example, if the local port for Dropbox operations is consistently either 80 or 443, then a rule may be generated for detecting anomalies in Dropbox operations when the local port is any value other than 80 or 443. Conversely, property element values for a property element that contains several unique values may indicate that the property element is not a good candidate for rule generation since observed values from operations fluctuate between several different values.

In an embodiment, the aggregated operation scoring instructions 135 provide instruction to calculate score values for the aggregated baseline dataset based upon the distinct value count associated with each property element value. As discussed in step 315, the distinct value count tracks the number of unique values identified for each property element. Using distinct value counts, each of the property elements within an aggregated baseline dataset may be scored to determine which property elements should be used for rule creation. A score value for a property element may be calculated using the total number of values in the set of values for the property element, the number of distinct values based on the distinct value count for the property element, and determining the number of duplicate values that do not match other values within the set of values. Based upon the total number of values and the number of duplicate values, a baseline of expected values may be determined. For example, if the set of values for a local port contains {80, 80, 443, 80, 443, 443, and 355}, then it may be determined based on the number of duplicates for values 80 and 443 that both values 80 and 443 are baseline expected values and the value 355 is a value that does not match the other baseline values.

In an embodiment, score values may be calculated using a ratio of the total number of values within the set of values and the number of values that do not match the baseline values. The following pseudocode provides an example of calculating a score value:

entrycnt=<number of values, within the set of values, for the element> newcnt=<number of values, within the set of values, whose content does not match the expected baseline values> score_ns=int((1.0−float(newcnt/entrycnt)*100))

where score_ns is a calculated score value on a scale of 0 to 100 and is based upon the ratio of values that make up the expected baseline values.

In an embodiment, the calculated score value may be updated when additional operation data is received from the plurality of computing nodes 105, 110, and 115 respectively. For example, if additional operations are added to an existing aggregated baseline, then an updated score value may be calculated by updating the total entrycnt, the newcnt if the new values do not match expected baseline values, and recalculating the score_ns based on the updated entrycnt and newcnt. In another embodiment, the calculated score values may be updated from user feedback received from one or more monitoring agents such as agent 107.

The calculated score value may be adjusted based upon the total number of values that make up the set of values for an element. For example, if the set of values used to calculate the score value is low, then the ratio of unexpected values over total number of values may be unnecessarily skewed by the low total value count. In an embodiment, the calculated score value may be adjusted using a smoothing function that adjusts the calculated score value based upon the total number of values within the set of values. The following pseudocode provides an example of a smoothing function that modifies the score value to take into account the total number of values used to determine the score value:

score=min(Analyzer.time_smooth(score_ns,entrycnt, 100),score_ns)

where "score" equals an adjusted score that is the minimum value of the originally calculated score_ns and an adjusted score_ns value when the smoothing function is applied. Embodiments of the smoothing function may include any type of mathematical adjustment factor that may reduce the score_ns value based upon the total number of values used to calculate the score_ns.

In an embodiment, protection functions may be implemented that ensure that calculated score values are not purposefully skewed by any one type of operation or any set of operations that originate from a single source. In one example, a large number of identical operations may skew the values for a particular element. If the large number of identical operations originated from a single source, either purposefully or coincidentally, then the single source may influence the score value calculation and in turn influence rule generation based upon the skewed score value. Score value calculation may be configured to minimize a single user or type of operation in order prevent certain operations from skewing the set of calculated score values. In an embodiment, score value calculation for an element may include generating separate score values for the element based upon the user ID associated with each operation. By calculating scores based on the element and the user ID, large numbers of operations from a single user may not influence a particular score value for the element. The score value for the particular element may then be calculated as an aggregate of calculated score values from each user ID from the set of operations. In another embodiment, each user ID may be assigned its own score value for the element, thereby eliminating score value influence from other users.

In an embodiment, the calculated scores for elements and sub-elements may be stored within the aggregated baseline dataset. For example, if the aggregated baseline dataset is represented as a data hierarchal structure with elements and sub-elements, then the calculated score for each element may be stored within a score property value within each element.

Referring back to FIG. 3, at step 325 the rule generation instructions 140 determine whether elements within the set of aggregated baselines may be used for generating a rule.

In an embodiment, one or more property values from elements may be used to generate an operation rule if the calculated score values for the elements exceeds the stored score threshold value from step 305. For example, if the stored score threshold value is 85 out of 100 and a calculated score value for a particular element is 90 out of 100, then the property values within the particular element may be used to generate a rule that describes expected property values for the particular element for new operations. In an embodiment, the rule generation instructions 140 provide instructions to evaluate all elements that have calculated score values within the aggregated baseline to determine which elements and sub-elements may be used for rule generation. If a calculated score value for an element is below the score threshold value then the element will not be used for rule generation and the monitoring system 120 will continue to evaluate the remaining property elements within the aggregated baseline dataset.

At step 330, the rule generation instructions 140 provide instruction to automatically generate a set of baseline operation rules based upon the elements in the aggregated baseline dataset that have calculated score values that exceed the stored score threshold value. In an embodiment, one or more rules may be generated from the elements within the aggregate baseline dataset. For example, elements that represent regular file reads and local connected ports may have calculated score values that exceed the stored score threshold value and may be used to generate one or more rules for expected operations. One such rule may be based on the expected property values in the regular file reads elements. For instance, if the expected property values include file-A and file-B that are read during operations within the particular aggregated baseline dataset, then a regular file read rule may be generated that specifies that only file-A and file-B are expected files to be read during performance of the particular operation. If during an operation governed by the regular file read rule performs a file read on another file, such as file-C, then the regular file read rule may be used to determine that the operation performed was an anomalous operation. Similarly, a local connected ports rule may be generated using the expected property values from the local connected ports element.

In an embodiment, one or more elements may be combined to create a combination rule based on properties from the one or more elements. Using the previous example, a file read-local connected port combination rule may be generated that specifies new operations are valid if the operation properties values for file reads and local connected ports fall within the defined value ranges for file reads and local connected ports as defined in the file read-local connected port combination rule. If either a file is read that is not defined in the file read-local connected port combination rule or a local port is connected to that is not defined in the file read-local connected port combination rule, then the operation may be interpreted as being an anomalous operation.

In an embodiment, baseline operation rules generated may include specific template definitions that may be configured to incorporate customized rules that are based upon initialization parameters specific to the application and container being monitored. For example, at initialization, a specific container may specify certain input parameters for TCP ports or definition files to be used. The baseline operation rule may be configured to define allow able TCP ports and definition files used during initialization. By generating baseline operation rules based upon template definitions, the baseline operation rules may be customized to each container and application based upon the configuration options defined with configuration files for each container.

In an embodiment, the set of baseline operation rules for the aggregated baseline dataset may be stored within the rules repository 160 for use by the operations detection system 170. The operations detection system 170 represents a rules enforcement system that may organize and delegate operation rules for specific computing nodes, containers, and applications to one or more agents in order to monitor and detect operation anomalies based upon the generated rules. In an embodiment, the set of baseline operation rules may be configured for specific computing nodes, containers, or applications.

In an embodiment, the set of baseline operation rules may be further configured to identify anomalous operations that have occurred within a monitored environment or may be used to filter anomalous operations from occurring within the monitored environment. For instance, the set of baseline operation rules may be configured to generate specific alerts when operation input or output triggers an anomaly based on the set of baseline operation rules. For example, an alert may be generated when a container reads a file that is included within the set of baseline files defined in a specific rule. The set of baseline operation rules may also be configured as a filter to be used within a kernel of a computing node. For example, kernel 205 within computing node 105 may be configured to implement the set of baseline operation rules as an anomaly exception filter that prevents anomalous operations from execution. For instance, if an operation requests opening a specific file that is not part of the set of baseline files defined in the specific rule, then the kernel 205 may prevent the operation from executing. In an embodiment, usage configurations for the set of baseline operation rules may be stored within the rules repository 160.

The rule generation instructions 140 may provide instruction to automatically update existing sets of baseline operation rules based upon the elements in the aggregated baseline dataset. In an embodiment, the aggregated baseline dataset may be based on operations related to a specific application or container to which generated rules already exist. In this scenario, elements of the aggregated baseline dataset may be used to update the existing rules stored in the rules repository 160. Updates may include modifying sets of expected input or output for one or more element properties. By allowing baseline operation rules to be updated based upon new operation information. The baseline operation rules may be tailored to the latest operations and interactions occurring on applications and containers of interest.

Referring back to FIG. 3, step 335 depicts transmitting a set of baseline operation rules to a computing node. In an embodiment, the operation detection system 170 accesses and transmits a set of baseline operation rules 180 from the rule repository 160 to one or more agents, such as agent 107 residing on computing node 105, for the purposes of detecting anomalous operations executing on computing node 105. The operation detection system 170 may be configured to transmit the set of baseline operation rules 180 that include configuration options for triggering alerts when an anomalous operation occurs within the computing node 105 and for filtering particular anomalous operations from occurring on the computing node 105.

In an embodiment, the agent 107 may be configured to receive the set of baseline operation rules 180 and implement rule-based activity monitoring that monitors activity between the kernel 205 and the one or more running applications and containers interacting with the kernel 205.

For example, the set of baseline operation rules 180 may include, but are not limited to, rules that define expected system call operations, operation parameters, and output from requested operations. The agent 107 may monitor activity between the containers 225 and 235, applications 215, 220, 227, and 237, and the kernel 205 to determine whether any requested operations include property values that are not defined within the set of baseline operation rules 180. If an operation contains property values not defined within a specific rule, then the agent 107 may determine that the operation is an anomaly and may generate an alert. In an embodiment, the alert may be transmitted directly to a system administrator account or a user account, or may be transmitted to the operation detection system 170. In an embodiment, alerts transmitted to the operation detection system 170 may be stored and transmitted to one or more users or administrators. Stored alerts may be stored within the rules repository 160 for the purpose of analyzing trends and updating existing rules depending on whether the anomalous operations are frequently occurring and whether the property values should be considered part of the expected values.

In an embodiment, user feedback may be used to update the set of baseline operation rules 180. The agent 107 may be configured to, upon detecting an anomalous operation, generate an interactive event message that is displayed to the current user. For example, if a user is interacting with container 225 and the agent 107 detects an anomalous operation from container 225, then the agent 107 may generate a pop-up message or other type of notification that is displayed to the user. The message may include a user interface that allows the user to select from options that include, but are not limited to, acknowledging the event message, flagging the event message as being inaccurate, and temporarily allowing the anomalous operation associated with the event message. Additionally, the user feedback may also include a user-inputted score that is assigned as an accuracy value for the rule used to flag the anomalous operation. For example, if an operation was identified as anomalous, then the user may be presented with a message that indicates the anomalous operation identified and the rule used to identify the operation. The user may then select an option that confirms the detected anomalous operation and the user may assign an accuracy score to the rule used to detect the anomalous operation.

In an embodiment, flagging the event message as inaccurate may trigger the agent 107 to transmit the user feedback to the operations detection system 170. The operations detection system 170 may be configured to incorporate user feedback sent from the agent 107 into the rule generation by updating the specific rules that incorrectly flagged operations as anomalous. Updating of the rules may include converting the feedback into an adjustment score that may be inputted into step 320 to update existing scores of elements of the aggregated baseline.

In an embodiment, the set of baseline operation rules 180 may comprise subsets of baseline operation rules tailored to specific containers and applications running on the computing node 105. For example, referring to FIG. 2, the set of baseline operation rules 180 may include subsets of baseline operation rules specific to monitoring operations from each of the applications 215, 220, 227, and 237, and the containers 225 and 235. Each of the subsets of baseline operation rules may be based on specific aggregated baselines compiled from operations from each of the applications 215, 220, 227, and 237, and the containers 225 and 235.

In an embodiment, subsets of the set of baseline operation rules 180 may include baseline operation rules that are based upon parameter template definitions. The agent 107 may be configured to incorporate customizations of applications and containers by interpreting configuration files, command line parameters, environment variables, and any other mechanism used to customize an application and container. Customization information may then be incorporated by the parameter template definitions in order to incorporate customized baseline operation rules.

In an embodiment, the set of baseline operation rules may include subsets of baseline operation rules generated from different aggregated baselines. For example, a first subset of baseline operation rules may be based on an aggregated baseline derived from operations from container-A and a second subset of baseline operation rules may be based on an aggregated baseline derived from operations from container-B. If container-A is a container image that is instantiated within an image of container-B, then the set of baseline operation rules used to monitor operations for container-A may include the first subset of baseline operation rules and an inherited subset of baseline operation rules based on the second subset of baseline operation rules. For example referring to FIG. 2, multiple subsets of baseline operation rules may be used to monitor application 227, which is running within container 225. In this scenario, the baseline operation rules used to monitor application 227 may include a subset specific to application 227 and another subset that is inherited from the container 225. By compiling a complete set of usable baseline operation rules from rules specific to the application and rules inherited from the environment that the application is running in, the set of usable baseline operation rules may be customized to monitor values of properties of operations specific to a target application and properties of operations specific to the unique environment in which the target application is running Another example of using multiple subsets of baseline operation rules include incorporating baseline rules that may be specific to a particular operating system with a specific application. For instance, if container 235 is running an image of the Linux operating system Ubuntu and application 237 is running within container 235, then subsets of baseline operation rules may be used to monitor operations from application 237 that include a subset of specific rules generated for application 237 and a subset of specific rules that are relevant to the Ubuntu operating system. Additionally, if container 235 implemented an image of the Windows operating system, then monitoring application 237 may include using baseline operation rules specific to application 237 and baseline operation rules specific to the Windows operating system.

In an embodiment, an agent may use the set of baseline operation rules to filter out anomalous operations from being executed. Referring back to FIG. 2, agent 107 may be configured to implement filtering triggers based upon the set of baseline operation rules 180 received from the operations detection system 170. Agent 107 may use exception handling mechanisms to catch operations flagged as anomalies and filter them out by preventing execution of the operations. For instance, agent 107 may use tracepoints within the kernel module 210 to identify property values of anomalous operations based upon the set of baseline operation rules 180, and within the tracepoints, force the particular operation to fail, thus preventing the operation from executing.

In another embodiment, the set of baseline operation rules may be used to filter out anomalous operations by integrating the set of baseline operation rules into the operating system's existing filtering mechanisms. For example, the set of baseline operation rules may be integrated into a network filtering framework such as Netfilter or integrated into SELinux for I/O and process execution filtering.

In an embodiment, configuration of monitoring rules based on the received set of baseline operation rules may be configured using container management systems and orchestrators. Different orchestrators may include commercial implementations such as Kubernetes and Mesos, which may be used to extract metadata useful for configuring how agent 107 uses the set of baseline operation rules 180 received from the operations detection system 170. For example, orchestrator configuration files may used to configure the extent to which the agent uses the set of baseline operation rules 180 for monitoring operations. In an embodiment, the agent 107 may be configured to read the orchestrator configuration files and based on the orchestrator configuration, the agent 107 may configure monitoring of operations. In another embodiment, the agent 107 may be configured from an orchestrator user interface, where a user may customize which baseline operation rules are enforced based upon the desired monitoring level. For example, if a user intends to restrict access of incoming requests, then the user may use the orchestrator to configure the agent 107 to only allow requests from a specific port, such as port 80. Additionally, the agent 107 may be configured to implement different rules based upon the desired runtime environment. For example, the agent 107 may be configured to monitor operations based on a subset of baseline operation rules for a production environment, a quality assurance environment, and a developer environment, where each environment enforces a different set of rules from the set of baseline operation rules 180.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
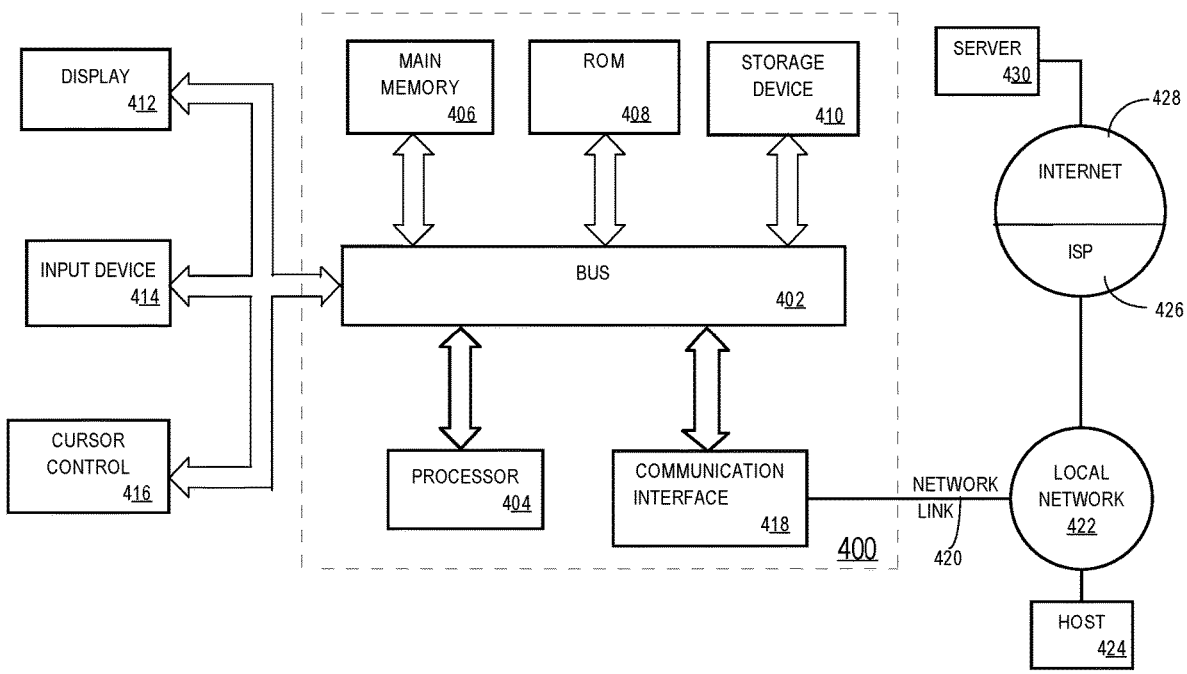
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

APPENDIX

TABLE 1

Example of Dropbox Program Table – JSON format

```
{
    "bound_ports" :
    {
        "startup" :
        {
            "l_tcp" :
            {
                "d" :
                {
                    "17500" : 1,
                    "17600" : 1,
                    "843" : 1
                },
                "full" : false
            },
            "l_udp" :
            {
                "d" :
                {
                    "17500" : 1
                },
                "full" : false
            }
        }
    },
    "c_subnet_endpoints" :
    {
```

```
"startup" :
{
    "c_tcp" :
    {
        "d" :
        {
            "192.168.131.0" : 1
        },
        "full" : false
    },
    "s_tcp" :
    {
        "d" :
        {
            "192.168.172.0" : 1,
            "192.168.17.0" : 1,
            "192.168.217.0" : 1,
            "192.168.232.0" : 1,
            "192.168.252.0" : 1
        },
        "full" : false
    }
}
},
"comm" : "dropbox",
"dirs" :
{
    "startup" :
    {
        "uncategorized" :
        {
            "d" :
            {
```

```
            "/dev/" : 1,
            "/home/someuser/.someserver/instance1/" :
            1,
            "/home/someuser/.someserver/instance_db/"
            : 1,
            "/home/someuser/sysdig/build/debug/usersp
            ace/alphabet/" : 1,
            "/tmp/" : 1,
            "/var/lib/libuuid/" : 1
        },
        "full" : false
    }
  }
},
"exe" :
"/home/someuser/.someserverdist/dropboxlnx.x86_649.4.49/dropbo
x",
"files" :
{
    "startup" :
    {
        "r" :
        {
            "d" :
            {
                "/tmp/tmp5r0L_C (deleted)" : 1,
                "/var/lib/libuuid/clock.txt" : 1,
                "/dev/urandom" : 1,
            },
            "full" : false
        },
        "rw" :
        {
```

```
"d" :
{
    "/dev/null" : 1,
    "/home/someuser/.someserver/instance1/TO_
    HASH_riUNev" : 1,
    "/home/someuser/.someserver/instance1/agg
    regation.dbx" : 1,
    "/home/someuser/.someserver/instance1/che
    cker.dbx" : 1,
    "/home/someuser/.someserver/instance1/con
    fig.dbx" : 1,
    "/home/someuser/.someserver/instance1/del
    eted.dbx" : 1,
    "/home/someuser/.someserver/instance1/fil
    ecache.dbx" : 1,
    "/home/someuser/.someserver/instance1/fil
    ecache.dbxshm"
    : 1,
    "/home/someuser/.someserver/instance1/fil
    ecache.dbxwal"
    : 1,
    "/home/someuser/.someserver/instance1/not
    ifications.dbx" : 1,
    "/home/someuser/.someserver/instance1/res
    ync.dbx" : 1,
    "/home/someuser/.someserver/instance1/sig
    store.dbx" : 1,
    "/home/someuser/.someserver/instance_db/i
    nstance.dbx" : 1,
},
"full" : false
}
}
```

```
            },
        "ip_endpoints" :
        {
            "startup" :
            {
                "c_tcp" :
                {
                    "d" :
                    {
                        "192.168.131.1" : 1
                    },
                    "full" : false
                },
                "s_tcp" :
                {
                    "d" :
                    {
                        "192.168.172.193" : 1,
                        "192.168.172.236" : 1,
                        "192.168.17.131" : 1,
                        "192.168.217.65" : 1,
                        "192.168.232.109" : 1,
                        "192.168.252.96" : 1
                    },
                    "full" : false
                }
            }
        },
        "server_ports" :
        {
            "startup" :
            {
                "l_tcp" :
```

```
            {
                "d" :
                {
                    "17500" : 1
                },
                "full" : false
            },
            "r_tcp" :
            {
                "d" :
                {
                    "443" : 1
                },
                "full" : false
            }
        },
        "user_id" : 0
    },
    {
        "bound_ports" :
        {
            "startup" :
            {
                "l_udp" :
                {
                    "d" :
                    {
                        "64869" : 1,
                        "68" : 1
                    },
                    "full" : false
                }
```

```
        }
},
"comm" : "dhclient",
"dirs" :
{
    "startup" :
    {
        "uncategorized" :
        {
            "d" :
            {
                "/dev/" : 1,
                "/var/lib/NetworkManager/" : 1
            },
            "full" : false
        }
    }
},
"exe" : "/sbin/dhclient",
"files" :
{
    "startup" :
    {
        "uncategorized" :
        {
            "d" :
            {
                "/dev/null" : 1,
                "/var/lib/NetworkManager/dhclient298
                f60bc6e9541f6805897246aa73c72eth0.
                lease" : 1
            },
```

```
                "full" : false
            }
        }
    },
    "user_id" : 0
}
```

TABLE 2.

Example of Aggregated Baseline of Operations

```
{
    "info" : {
        "count_existing" : 26,
        "expect_multiple_sources" : true,
        "count_new" : 2,
        "unique_ids" : {
            "256706c57425" : 0,
            "cfebe1db9891" : 0
        },
        "name" : "redis:2.8.19"
    },
    "files" : {
        "regular" : {
            "r" : {
                "addcnt_existing" : 1,
                "full" : false,
                "d" : {
                    "/proc/1/stat" : 26
                },
                "addcnt_new" : 1
```

```
        },
        "other" : {
            "addcnt_existing" : 0,
            "full" : false,
            "d" : {
            },
            "addcnt_new" : 0
        },
        "rw" : {
            "addcnt_existing" : 0,
            "full" : false,
            "d" : {
            },
            "addcnt_new" : 0
        },
        "uncategorized" : {
            "addcnt_existing" : 1,
            "full" : false,
            "d" : {
                "/dev/null" : 26,
                "/data/appendonly.aof" : 26
            },
            "addcnt_new" : 1
        }
    },
    "startup" : {
        "r" : {
            "addcnt_existing" : 0,
            "full" : false,
            "d" : {
            },
            "addcnt_new" : 0
        },
```

```
            "other" : {
                "addcnt_existing" : 0,
                "full" : false,
                "d" : {
                },
                "addcnt_new" : 0
            },
            "rw" : {
                "addcnt_existing" : 0,
                "full" : false,
                "d" : {
                },
                "addcnt_new" : 0
            },
            "uncategorized" : {
                "addcnt_existing" : 0,
                "full" : false,
                "d" : {
                },
                "addcnt_new" : 0
            }
        }
    },
    "executed_programs" : {
        "regular" : {
            "p" : {
                "addcnt_existing" : 0,
                "full" : false,
                "d" : {
                },
                "addcnt_new" : 0
            }
        },
```

```
            "startup" : {
                "p" : {
                    "addcnt_existing" : 0,
                    "full" : false,
                    "d" : {
                    },
                    "addcnt_new" : 0
                }
            }
        },
        "c_subnet_endpoints" : {
            "regular" : {
                "udp" : {
                    "addcnt_existing" : 0,
                    "full" : false,
                    "d" : {
                    },
                    "addcnt_new" : 0
                },
                "c_tcp" : {
                    "addcnt_existing" : 1,
                    "full" : false,
                    "d" : {
                        "127.0.0.0" : 26,
                        "127.0.83.0" : 26,
                        "127.0.66.0" : 26,
                        "127.0.69.0" : 26
                    },
                    "addcnt_new" : 1
                },
                "s_tcp" : {
                    "addcnt_existing" : 0,
                    "full" : false,
```

```
            "d" : {
            },
            "addcnt_new" : 0
        }
    },
    "startup" : {
        "udp" : {
            "addcnt_existing" : 0,
            "full" : false,
            "d" : {
            },
            "addcnt_new" : 0
        },
        "c_tcp" : {
            "addcnt_existing" : 0,
            "full" : false,
            "d" : {
            },
            "addcnt_new" : 0
        },
        "s_tcp" : {
            "addcnt_existing" : 0,
            "full" : false,
            "d" : {
            },
            "addcnt_new" : 0
        }
    }
},
"ip_endpoints" : {
    "regular" : {
        "udp" : {
            "addcnt_existing" : 0,
```

```
            "full" : false,
            "d" : {
            },
            "addcnt_new" : 0
        },
        "c_tcp" : {
            "addcnt_existing" : 2,
            "full" : false,
            "d" : {
                "127.2.69.0" : 26,
                "127.2.66.0" : 13,
                "127.2.66.1" : 13,
                "127.2.83.1" : 13,
                "127.2.83.0" : 13,
                "127.0.0.1" : 26
            },
            "addcnt_new" : 2
        },
        "s_tcp" : {
            "addcnt_existing" : 0,
            "full" : false,
            "d" : {
            },
            "addcnt_new" : 0
        }
    },
    "startup" : {
        "udp" : {
            "addcnt_existing" : 0,
            "full" : false,
            "d" : {
            },
            "addcnt_new" : 0
```

```
        },
        "c_tcp" : {
            "addcnt_existing" : 0,
            "full" : false,
            "d" : {
            },
            "addcnt_new" : 0
        },
        "s_tcp" : {
            "addcnt_existing" : 0,
            "full" : false,
            "d" : {
            },
            "addcnt_new" : 0
        }
    }
},
"server_ports" : {
    "regular" : {
        "l_tcp" : {
        "addcnt_existing" : 1,
        "full" : false,
        "d" : {
            "6379" : 26
        },
        "addcnt_new" : 1
    },
    "r_tcp" : {
        "addcnt_existing" : 0,
        "full" : false,
        "d" : {
        },
        "addcnt_new" : 0
```

```
        },
        "l_udp" : {
            "addcnt_existing" : 0,
            "full" : false,
            "d" : {
            },
            "addcnt_new" : 0
        },
        "r_udp" : {
            "addcnt_existing" : 0,
            "full" : false,
            "d" : {
            },
            "addcnt_new" : 0
        }
    },
    "startup" : {
        "l_tcp" : {
            "addcnt_existing" : 0,
            "full" : false,
            "d" : {
            },
            "addcnt_new" : 0
        },
        "r_tcp" : {
            "addcnt_existing" : 0,
            "full" : false,
            "d" : {
            },
            "addcnt_new" : 0
        },
        "l_udp" : {
            "addcnt_existing" : 0,
```

```
            "full" : false,
            "d" : {
            },
            "addcnt_new" : 0
        },
        "r_udp" : {
            "addcnt_existing" : 0,
            "full" : false,
            "d" : {
            },
            "addcnt_new" : 0
        }
    }
},
"cdirs" : {
    "regular" : {
        "r" : {
            "addcnt_existing" : 1,
            "full" : false,
            "d" : {
                "/proc/1/" : 0
            },
            "addcnt_new" : 1
        },
        "other" : {
            "addcnt_existing" : 0,
            "full" : false,
            "d" : {
            },
            "addcnt_new" : 0
        },
        "rw" : {
            "addcnt_existing" : 0,
```

```
            "full" : false,
            "d" : {
            },
            "addcnt_new" : 0
        },
        "uncategorized" : {
            "addcnt_existing" : 1,
            "full" : false,
            "d" : {
                "/data/" : 0,
                "/dev/" : 0
            },
            "addcnt_new" : 1
        }
    },
    "startup" : {
        "r" : {
            "addcnt_existing" : 0,
            "full" : false,
            "d" : {
            },
            "addcnt_new" : 0
        },
        "other" : {
            "addcnt_existing" : 0,
            "full" : false,
            "d" : {
            },
            "addcnt_new" : 0
        },
        "rw" : {
            "addcnt_existing" : 0,
            "full" : false,
```

```
            "d" : {
            },
            "addcnt_new" : 0
        },
        "uncategorized" : {
            "addcnt_existing" : 0,
            "full" : false,
            "d" : {
            },
            "addcnt_new" : 0
        }
    }
},
"dirs" : {
    "regular" : {
        "r" : {
            "addcnt_existing" : 1,
            "full" : false,
            "d" : {
                "/proc/1/" : 26
            },
            "addcnt_new" : 1
        },
        "other" : {
            "addcnt_existing" : 0,
            "full" : false,
            "d" : {
            },
            "addcnt_new" : 0
        },
        "rw" : {
            "addcnt_existing" : 0,
            "full" : false,
```

```
            "d" : {
            },
            "addcnt_new" : 0
        },
        "uncategorized" : {
            "addcnt_existing" : 1,
            "full" : false,
            "d" : {
                "/data/" : 26,
                "/dev/" : 26
            },
            "addcnt_new" : 1
        }
    },
    "startup" : {
        "r" : {
            "addcnt_existing" : 0,
            "full" : false,
            "d" : {
            },
            "addcnt_new" : 0
        },
        "other" : {
            "addcnt_existing" : 0,
            "full" : false,
            "d" : {
            },
            "addcnt_new" : 0
        },
        "rw" : {
        "addcnt_existing" : 0,
            "full" : false,
            "d" : {
```

```
                },
                "addcnt_new" : 0
            },
            "uncategorized" : {
                "addcnt_existing" : 0,
                "full" : false,
                "d" : {
                },
                "addcnt_new" : 0
            }
        }
    },
    "bound_ports" : {
        "regular" : {
            "l_tcp" : {
                "addcnt_existing" : 1,
                "full" : false,
                "d" : {
                    "6379" : 26
                },
                "addcnt_new" : 1
            },
            "r_tcp" : {
                "addcnt_existing" : 0,
                "full" : false,
                "d" : {
                },
                "addcnt_new" : 0
            },
            "l_udp" : {
                "addcnt_existing" : 0,
                "full" : false,
                "d" : {
```

```
            },
            "addcnt_new" : 0
        },
        "r_udp" : {
            "addcnt_existing" : 0,
            "full" : false,
            "d" : {
            },
            "addcnt_new" : 0
        }
    },
    "startup" : {
        "l_tcp" : {
            "addcnt_existing" : 0,
            "full" : false,
            "d" : {
            },
            "addcnt_new" : 0
        },
        "r_tcp" : {
            "addcnt_existing" : 0,
            "full" : false,
            "d" : {
            },
            "addcnt_new" : 0
        },
        "l_udp" : {
            "addcnt_existing" : 0,
            "full" : false,
            "d" : {
            },
            "addcnt_new" : 0
        },
```

```
            "r_udp" : {
                    "addcnt_existing" : 0,
                    "full" : false,
                    "d" : {
                    },
                    "addcnt_new" : 0
            }
        }
    }
}
```

What is claimed is:

1. A computer-implemented method of monitoring applications executing on a plurality of computing nodes, said method comprising:
deploying agents on the computing nodes, at least one agent on each computing node, to detect operations performed on different objects by the executing applications;
at each of the computing nodes, storing by a corresponding one of the agents, records of the operations performed on the different objects by the executing applications, that contain properties of the operations performed on the different objects by the executing applications, in a plurality of program tables that include a first program table for storing the records of the operations performed on the different objects by a first executing application and a second program table for storing the records of the operations performed on the different objects by a second executing application, and associating each of the operations with a set of metadata properties;
organizing the operations having records stored in the plurality of program tables into groups based on the metadata properties;
for one of the groups, generating a monitoring rule based on the properties of the the operations of the one group that are stored in the records thereof; and
configuring the agents according to the generated monitoring rule.

2. The computer-implemented method of claim 1, wherein the agents are configured according to the generated monitoring rule so that anomalous operations performed by the executing applications are detected.

3. The computer-implemented method of claim 1, wherein the agents are configured according to the generated monitoring rule so that anomalous operations are filtered from being performed by the executing applications.

4. The computer-implemented method of claim 1, wherein the operations detected include system calls, file system activity, disk activity, network and socket activity, established connections, open ports, process and thread execution, and inter process communications.

5. The computer-implemented method of claim 4, wherein each of the records contains properties describing (1) the operation executed, (2) the process or program that executed the operation, (3) the object that was the target of the operation, and (4) the application within which the operation was executed.

6. The computer-implemented method of claim 5, wherein the metadata properties include host identifiers, user identifiers, cloud service provider instance identifiers, and container identifiers.

7. The computer-implemented method of claim 1, wherein
each of the records stored in the first program table and the second program table is associated with a set of metadata properties.

8. The computer-implemented method of claim 7, wherein
the groups include first and second groups, and
the first group includes records of operations that are performed by either the first or the second application and are associated with a container having a first container identifier, and the second group includes records of operations that are performed by either the first or the second application and are associated with a container having a second container identifier.

9. The computer-implemented method of claim 8, wherein
a first monitoring rule is generated for the first group and a second monitoring rule is generated for the second group, and
the agents are configured according to the first and second monitoring rules so that anomalous operations that are performed by the executing applications and associated with the first container identifier are detected and anomalous operations associated with the second container identifier are filtered from being performed by the executing applications.

10. A non-transitory computer readable medium comprising instructions that are executable in a computer system to carry out a method of monitoring applications executing on a plurality of computing nodes, wherein agents are deployed on the computing nodes, at least one agent on each computing node, to detect operations performed on different objects by the executing applications, said method comprising:
at each of the computing nodes, storing by a corresponding one of the agents, records of the operations performed on the different objects by the executing applications, that contain properties of the operations performed on the different objects by the executing applications, in a plurality of program tables that include a first program table for storing the records of the operations performed on the different objects by a first executing application and a second program table for storing the records of the operations performed on the different objects by a second executing application, and associating each of the operations with a set of metadata properties;
organizing the operations having records stored in the plurality of program tables into groups based on the metadata properties;
for one of the groups, generating a monitoring rule based on the properties of the operations of the one group that are stored in the records thereof; and
configuring the agents according to the generated monitoring rule.

11. The non-transitory computer readable medium of claim 10, wherein the agents are configured according to the generated monitoring rule so that anomalous operations performed by the executing applications are detected.

12. The non-transitory computer readable medium of claim 10, wherein the agents are configured according to the generated monitoring rule so that anomalous operations are filtered from being performed by the executing applications.

13. The non-transitory computer readable medium of claim 10, wherein the operations detected include system calls, file system activity, disk activity, network and socket activity, established connections, open ports, process and thread execution, and inter process communications.

14. The non-transitory computer readable medium of claim 13, wherein each of the records contains properties describing (1) the operation executed, (2) the process or program that executed the operation, (3) the object that was the target of the operation, and (4) the application within which the operation was executed.

15. The non-transitory computer readable medium of claim 14, wherein the metadata properties include host identifiers, user identifiers, cloud service provider instance identifiers, and container identifiers.

16. The non-transitory computer readable medium of claim 10, wherein
each of the records stored in the first program table and the second program table is associated with a set of metadata properties.

17. The non-transitory computer readable medium of claim 16, wherein
the groups include first and second groups, and
the first group includes records of operations that are performed by either the first or the second application and are associated with a container having a first container identifier, and the second group includes records of operations that are performed by either the first or the second application and are associated with a container having a second container identifier.

18. The non-transitory computer readable medium of claim 17, wherein
a first monitoring rule is generated for the first group and a second monitoring rule is generated for the second group, and
the agents are configured according to the first and second monitoring rules so that anomalous operations that are performed by the executing applications and associated with the first container identifier are detected and anomalous operations associated with the second container identifier are filtered from being performed by the executing applications.

19. A distributed computing environment comprising:
a plurality of computing nodes having agents deployed thereon, at least one agent on each computing node, to detect operations performed on different objects by applications executing thereon, store records of the operations performed on the different objects by the executing applications, that contain properties of the operations performed on the different objects by the executing applications, in a plurality of program tables that include a first program table for storing the records of the operations performed on the different objects by a first executing application and a second program table for storing the records of the operations performed on the different objects by a second executing application, and associate each of the operations with a set of metadata properties; and
a monitoring computing system that is programmed to perform the steps of:
organizing the operations having records stored in the plurality of program tables into groups based on the metadata properties;
for one of the groups, generating a monitoring rule based on the properties of the operations of the one group that are stored in the records thereof; and
transmitting the monitoring rule to the computing nodes,
wherein the agents are configured according to the transmitted monitoring rule.

20. The distributed computing environment of claim 19, wherein
a first monitoring rule is generated for a first group of the groups and a second monitoring rule is generated for a second group of the groups, and
the agents are configured according to the first and second monitoring rules so that anomalous operations that are performed by the executing applications and associated with a first container identifier are detected, and anomalous operations associated with a second container identifier are filtered from being performed by the executing applications.

* * * * *